United States Patent
Gassmann et al.

[11] 3,853,500
[45] Dec. 10, 1974

[54] METHOD AND APPARATUS FOR DEGASSING VISCOUS LIQUIDS AND REMOVING GAS BUBBLES SUSPENDED THEREIN

[75] Inventors: Hans-Ulrich Gassmann; Ching-Muh Chen, both of Fribourg, Switzerland; Michel Vermot, Sao Paulo, Brazil

[73] Assignee: Ciba-Geigy AG, Basle, Switzerland

[22] Filed: Jan. 22, 1973

[21] Appl. No.: 325,439

[30] Foreign Application Priority Data
Jan. 25, 1972  Switzerland.................... 01074/72

[52] U.S. Cl............................ 55/15, 55/164, 55/190, 55/277
[51] Int. Cl............................................ B01d 51/08
[58] Field of Search............ 55/15, 36, 52, 55, 164, 55/189, 190, 277, 165

[56] References Cited
UNITED STATES PATENTS
2,376,221   5/1945   Baker.................................. 55/15 x
3,608,272   9/1971   Peri et al. ............................... 55/15

FOREIGN PATENTS OR APPLICATIONS
669,102   11/1929   France............................. 55/36 X

*Primary Examiner*—Samih N. Zaharna
*Assistant Examiner*—Richard W. Burks
*Attorney, Agent, or Firm*—Wenderoth, Lind & Ponack

[57] ABSTRACT

A method and apparatus for degassing viscous liquids and removing gas bubbles suspended therein is provided, the method comprising allowing a liquid to flow into a gas tight vessel which is under reduced pressure, the liquid first passing an apertured partition which causes many more small bubbles to form in the liquid before it passes into the partially or fully evacuated vessel. The liquid therein is subject to ultrasonic vibrations which coagulates the numerous small bubbles with each other and with other bubbles causing them to rise to the surface of the liquid where they are drawn off by a vacuum pump.

11 Claims, 1 Drawing Figure

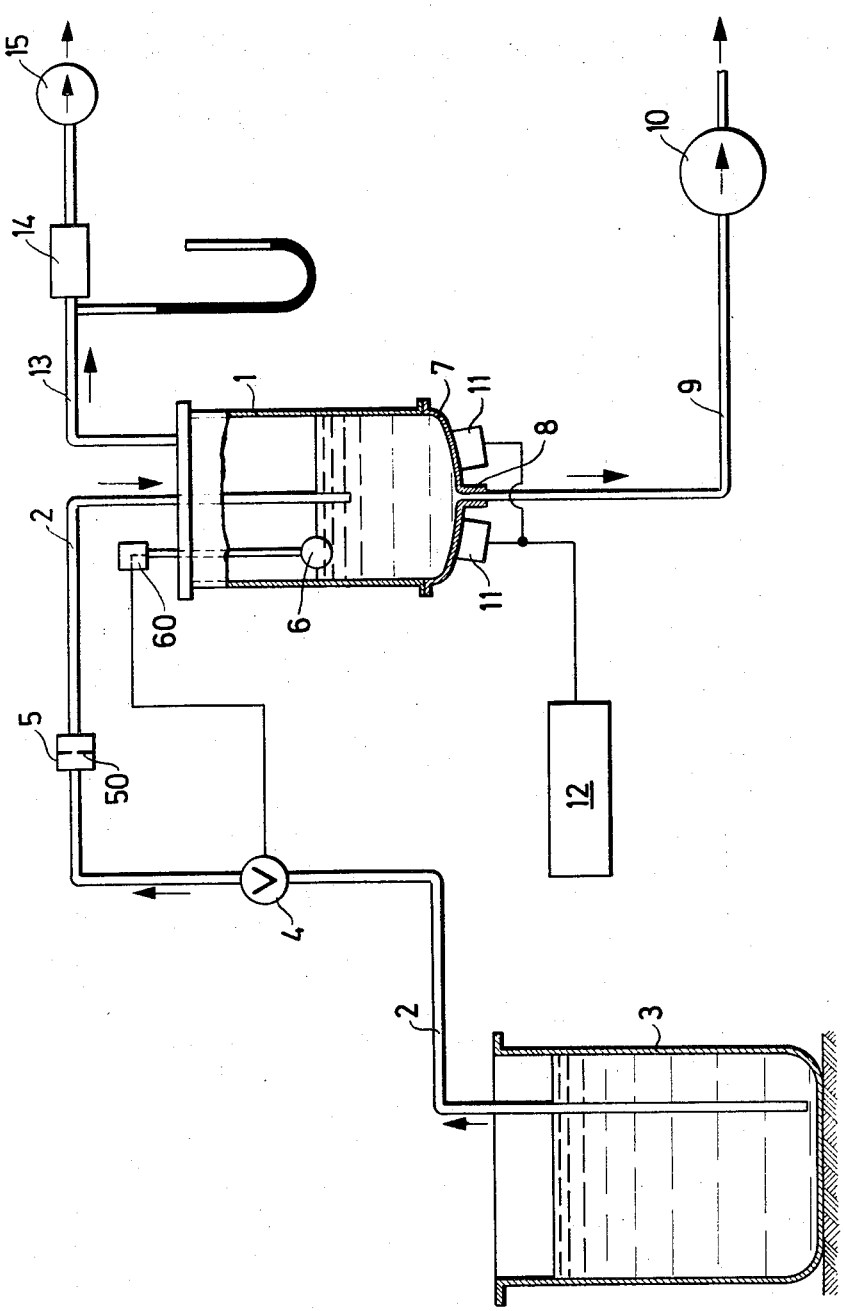

3,853,500

METHOD AND APPARATUS FOR DEGASSING VISCOUS LIQUIDS AND REMOVING GAS BUBBLES SUSPENDED THEREIN

FIELD OF THE INVENTION

This invention relates to a method of and apparatus for degassing liquids.

Gas bubble inclusions in a liquid are in many cases a source of disturbance, particularly in the production of mouldings and coatings by the solidification of such liquids. Gas bubbles may be included in the liquid in various ways, for example by mechanical effects, more particularly during mixing and homogenising, and during delivery through pipelines and by pumps, and also as a result of pressure or temperature variations resulting in the liberation of gas originally dissolved in the liquid. This latter phenomenon occurs particularly if the liquid is substantially saturated with dissolved gas. Bubbles have a disturbing effect when the optical homogeneity of the moulding or coating is important, for example in the manufacture of transparent sheeting, optical glasses, or photographic emulsions. In other cases, for example the production of spinning fibres, the presence of bubbles has an adverse effect on the strength of the formed materials.

There may be additional disturbances in the production of thin sheeting and coatings caused by extruders. The extrusion apparatus in such cases usually has a narrow gap through which the liquid is brought into the required form. Small gas bubbles frequently behave as elastic solids due to their surface tension and may therefore locally clog the narrow extrusion gap. This results in flaws in the form of streaks in the sheets or coatings over a considerable distance.

PRIOR ART

For these above reasons it is desirable to remove any bubbles from the liquid as completely as possible before the actual forming operation. This is usually done by allowing the liquid to stand for some time before it is used so that the bubbles rise to the surface by their own buoyancy. In the case of viscous liquids, however, this process takes a very long time and would undesirably slow down production. The ascent of the bubbles can be accelerated to some extent by reducing the pressure, but in many cases there are limits to this process because the boiling point of the liquid would be reached.

It has also already been disclosed to subject the bubble-containing liquid to an ultrasonic field, more particularly an ultrasonic field producing standing waves. In that case, the gas bubbles are conveyed by the sonic pressure to the minimum-amplitude locations of the sonic field, i.e., the nodal lines or planes thereof, where they are retained. If it is possible to keep the standing sonic field sufficiently stable and steady, bubble-free liquid can be removed at a suitable point. The disadvantage of the process is that it is very difficult to avoid some instabiliy in the position of the oscillation nodes, for example as a result of movements of the reflecting liquid surface. The bubbles therefore jump intermittently from one nodal plane to the other and may consequently occasionally reach the withdrawal point. The force exerted by the sonic pressure also drops as the bubble size decreases and the efficacy of the apparatus is therefore limited to relatively large bubbles. With this known method, only the gas fractions present in the form of free bubbles are removed from the liquid, although it would be equally desirable at least partially to remove the dissolved gas fractions as well. Where a reduction in pressure is used as mentioned above, some of the dissolved gas is also removed, but since the process involves surface evaporation it is a relatively slow procedure. Although it can be accelerated by renewing the surface, for example by agitation or forming a trickle film, these steps counteract the required separation of free bubbles owing to the accompanying liquid movement.

OBJECT OF THE INVENTION

The object of this invention is to provide a method by means of which it is possible to remove from a liquid both the free bubbles present therein and some of the gas dissolved in the liquid. Another object of the invention is to provide apparatus by means of which the process can be carried out, more particularly continuously.

BRIEF DESCRIPTION OF THE INVENTION

The invention relates to a method of degassing viscous liquids and for removing gas bubbles freely suspended therein, the liquid being allowed to flow into a vessel at reduced pressure where the gas bubbles are removed by ultrasonics the liquid being passed through an apertured partition before it enters the vessel. The cross-sectional area of the apertured partition is preferably so selected that the seed of flow therethrough is approximately 3–10 metres per second and the flow cross-sectional area is reduced to approximately 1/5 – 1/100th of the tube cross-sectional area before the apertured partition.

Apparatus for performing the above method comprises a gas tight vessel, a liquid reservoir, a liquid supply conduit leading from the reservoir to the vessel, a partition having an aperture the cross-sectional area of which is at maximum one-fifth of the inside cross-sectional area of the supply conduit, an evacuation conduit leading from the top part of the vessel via a vacuum pump, an emptying conduit leading from the bottom part of the vessel via a feed pump, and at least one ultrasonic oscillator disposed in or on the vessel.

The invention makes use of a combination of two effects, the efficacy being increased far beyond expectations as a result of such combination. The first effect is a degassing and spontaneous formation of bubbles at the apertured partition as a result of the abrupt expansion and turbulence occurring there. These bubbles in turn form seeds for the liberation of other quantities of gas from the liquid which is supersaturated in comparison with the surrounding pressure. The resulting suspension of gas bubbles in the liquid forms a froth, and in comparison with the original liquid the liquid now contains many more bubbles. This gas bubble suspension or froth is exposed to the ultrasonic field immediately after it has formed to produce the second effect. The fact that the numerous gas bubbles are crowded closely together in comparison with known processes (without an apertured partition) facilitates their rapid coagulation, and they initially form raspberrylike structures which under the further action of the ultrasonic field combine to form large single bubbles which rapidly rise to the surface. In these conditions a clear and substantially bubble-free layer of liquid forms which can be conveyed out of the evacuated chamber by means of a pump.

DETAILED DESCRIPTION OF PREFERRED EMBODIMENT

One exemplified embodiment of the apparatus according to the invention is illustrated in the accompanying drawing.

A feed pipe 2 connected to a reservoir 3 for the liquid which is to be degassed leads from above the reservoir 3 into a gas-tight vessel 1, the discharge end of the feed pipe 2 preferably being on the centre axis of the cylindrical vessel 1. The feed pipe also contains a valve 4 which can be opened and closed in a known manner, for example electromagnetically or pneumatically, and also a degassing nozzle 5 comprising a centrally apertured disc 50 which will hereinafter be referred to as an apertured partition. The aperture in the partition 50 has an angular edge (not a rounded or streamline edge) at least on its entry side. The vessel 1 contains a level sensor 6 which, when the liquid reaches a predetermined level in the vessel 1, automatically closes the valve 4 and, when the liquid falls below this level, automatically opens the valve 4 via a control member 60 and a control line. The base 7 of the vessel 1 is formed with a discharge aperture 8 centrally thereof and connected via a pipe 9 to a feed pump 10. Ultrasonic oscillators 11 are also disposed on the outer wall of the base 7 of the vessel 1 around the discharge aperture 8 and are induced to oscillate by means of an ultrasonic generator 12 in a known manner, for example piezoelectrically or by magnetostriction. The vessel 1 is also connected via a pipe 13 to a vacuum pump 15 by means of which the volume above the liquid in the vessel can be brought to a predetermined degree of vacuum which is adjustable by a vacuum controler 14.

In operation, the vessel 1 is evacuated to a predetermined pressure by the pump 15. After the valve 4 has opened, the liquid to be degassed flows out of the reservoir 3 through the valve 4 and the apertured partition 50 into the vessel 1 until the valve is automatically closed again when the predetermined liquid level has been reached. At the apertured partition 50, dissolved gas is liberated in the form of fine bubbles by the sudden pressure drop and entrained by the stream of liquid into the vessel 1. The liquid in the vessel 1 accordingly consists of a suspension of fine bubbles which are uniformly distributed in the surrounding liquid and gradually ascend as a result of buoyancy.

When the generator 12 is operated, the ultrasonic oscillators 11 produce high-frequency oscillations which are transmitted to the liquid via the base 7 of the vessel 1. These oscillations cause the gas bubbles to agglomerate rapidly to form larger structures which then begin to rise to the surface rapidly. A sharply defined horizontal boundary surface or front rapidly forms and rises vertically upwards. Beneath this boundary surface a layer of degassed and bubble-free liquid forms in the bottom part of the vessel 1 and can be pumped out and brought to normal pressure by way of the pipe 9 and feed pump 10.

The throughput of degassed liquid can at all times be adapted to consumption at any particular moment by varying the delivery of the pump 10. The top throughput limit is determined by the maximum amount of liquid which is delivered through the intake conduit 2, the valve 4 and the apertured partition 5 under the given pressure difference conditions. If the throughput were made larger, the level in the vessel 1 would drop and the vessel would finally completely empty. If, on the other hand, the throughput were made smaller than the maximum quantity, the level in the vessel would automatically be kept at a constant value by the opening and closing of the valve 4. The linear speed of the liquid through the apertured partition 50 remains substantially constant during the opening time of the valve 4 and can be determined from the ratio of the opening and closing times of the valve and the throughput at the liquid outlet. For a good degassing effect, this linear speed should be at least approximately 3 metres per second. This speed can be adjusted to the required value without difficulty by correct dimensioning of the intake conduit 2 and the apertured partition 50.

The output of the ultrasonic oscillators 11 and associated feed generator 12 must also be so dimensioned that for a given throughput the bubble front in the vessel 1 is at least stationary or in the process of ascending. The maximum possible throughput must be determined from case to case. Apart from the output of the ultrasonic generator, it depends on the viscosity of the liquid to be degassed and on the quanity and size distribution of the gas bubbles produced. The latter two factors can be influenced by suitable dimensioning of the apertured partition (aperture diameter) and the feed conduit.

EXAMPLE

In a practical embodiment of the apparatus previously described, the cylindrical vessel 1 was of a height of 60 cm and had an inside diameter of 30 cm, the vessel being pumped out to a controlled pressure of 300 Torr.abs. An aqueous gelatin solution at a temperature of 40°C and with a viscosity of 20 cp was drawn in via the intake conduit 2 through an apertured partition 50 having an aperture diameter of 9 m.m. The intake conduit 2 had a 40 mm diameter so that the average speed through the aperture cross-section was about 3.5 metres per second. A level controller 6 was so adjusted that the valve 4 closed automatically as soon as the liquid level was 40 cm above the vessel base 7. Eight cylindrical piezoelectrical oscillators of a diameter of 40 mm were arranged in a circle on the outside of the vessel base. The frequency generator operated at a frequency of 40 kHz and its available output was 800 W.

After the vessel 1 had been filled, the frequency generator 12 was switched on. The ultrasonic field rapidly caused the formation of a sharp boundary front between a bottom clear bubble-free layer of liquid and a top bubble-containing layer, the front travelling upwards at a speed of about 16 centimetres per minute. When the pump was started, it was possible to draw bubble-free gelatin solution through the outlet conduit, the maximum attainable throughput in continuous operation being about 11.5 litres per minute. Before the degassing operation the gelatin was saturated with air and after degassing the residual content was 60 percent of the saturation concentration.

What is claimed is:

1. A method of degassing viscous liquids and for removing gas bubbles suspended therein, said method comprising; passing the liquid through an apertured partition to degas and form bubbles in the liquid, the area of the aperture being a maximum of one-fifth the cross-sectional area of the stream of liquid introduced to said partition; passing the liquid, without removing gas bubbles therefrom, from the partition into a gas tight vessel; reducing the pressure inside the vessel such that the liquid flow through the aperture due to such pressure reduction, averaged over the cross-section thereof, is between 3 and 10 metres per second; and agitating the liquid by subjecting it to ultrasonic vibrations.

2. A method according to claim 1 wherein the partition is so formed as to provide an aperture the area of which is between 1/5th and 1/100th of the cross-sectional area of the stream of liquid introduced to said partition.

3. Apparatus for degassing viscous liquids and for removing gas bubbles suspended therein, comprising a closed gas-tight vessel, a liquid reservoir, a liquid supply conduit leading from the reservoir to the vessel, a partition within said conduit defining an aperture having a cross-sectional area which is at maximum one-fifth of the inside cross-sectional area of the supply conduit, an evacuation conduit connected to the top part of the vessel, a vacuum pump connected to the evacuation conduit for reducing the pressure inside the vessel in such an amount that the liquid flow through the aperture due to such pressure reduction averaged over the cross-section thereof is about 3 to 10 metres per second, an emptying conduit leading from the bottom part of the vessel, a feed pump connected to said emptying conduit to remove degassed liquid from the vessel, and at least one ultrasonic oscillator coupled to the vessel to agitate the liquid therein.

4. Apparatus according to claim 3, wherein the cross-sectional area of the aperture of the partition is at least one/hundredth of the inside cross-sectional area of the supply conduit.

5. Apparatus according to claim 3, wherein the cross-sectional area of the aperture of the partition is between approximately one/tenth and one/thirtieth of the inside cross-sectional area of the supply conduit.

6. Apparatus according to claim 3 wherein at least the front edge of the partition aperture as considered in the direction of flow is angular.

7. Apparatus according to claim 3, including a liquid level sensor within the vessel for sensing a predetermined level of liquid within said vessel, a valve disposed in the supply conduit, and a switch coupled to the valve and sensor so that operation of the latter on sensing said predetermined level actuates said valve.

8. Apparatus according to claim 3, wherein the supply conduit leads into the vessel below said predetermined level.

9. Apparatus according to claim 8, wherein the discharge end of the supply conduit lies on the centre axis of the vessel.

10. Apparatus according to claim 3 wherein the emptying conduit leads from the centre of the vessel base.

11. Apparatus according to claim 10, in which a plurality of ultrasonic oscillators are distributed around the point where the vessel discharges into the emptying conduit.

* * * * *